US012780140B2

(12) United States Patent
Muramatsu et al.

(10) Patent No.: US 12,780,140 B2
(45) Date of Patent: Nov. 3, 2026

(54) STEERING DEVICE

(71) Applicant: TOYODA GOSEI CO., LTD., Kiyosu (JP)

(72) Inventors: Kazuma Muramatsu, Aichi (JP); Akitoshi Naganawa, Aichi (JP); Itsuhiko Hirota, Aichi (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/400,719

(22) Filed: Nov. 25, 2025

(65) Prior Publication Data

US 2026/0152144 A1 Jun. 4, 2026

(30) Foreign Application Priority Data

Nov. 29, 2024 (JP) ................................ 2024-208725

(51) Int. Cl.
*B60R 21/203* (2006.01)

(52) U.S. Cl.
CPC ................................ *B60R 21/2037* (2013.01)

(58) Field of Classification Search
CPC ........................ B60R 21/2037; B60R 21/2035
See application file for complete search history.

(56) References Cited

U.S. PATENT DOCUMENTS 7,887,088 B2 * 2/2011 Worrell .................. B60Q 5/003 200/61.54
7,891,699 B2 * 2/2011 Worrell ............. B60R 21/21656 280/731
11,745,689 B1 * 9/2023 Kutchey ........... B60R 21/21656 280/728.3
11,754,262 B1 * 9/2023 Kang .................... B60R 21/215 362/511
12,036,939 B2 * 7/2024 Min ...................... B60R 21/203
2009/0273165 A1 * 11/2009 Worrell ............. B60R 21/21656 280/728.3
2011/0204602 A1 * 8/2011 James ................. B60R 21/2037 280/728.2

(Continued)

FOREIGN PATENT DOCUMENTS

CN 117508079 A * 2/2024 ........... B60R 21/203
DE 102024204048 A1 * 10/2025 ........... B60R 13/005

(Continued)

*Primary Examiner* — Nicole T Verley
(74) *Attorney, Agent, or Firm* — Posz Law Group, PLC

(57) ABSTRACT

A steering device includes: a steering body; a pad; a holding member; and an electronic component. The pad includes a ceiling wall portion disposed on a driver side and a peripheral wall portion extending downward in a tubular shape from a vicinity of a peripheral edge of the ceiling wall portion. A lead wire extending from an arrangement region for the electronic component in the ceiling wall portion extends from a back surface side of the ceiling wall portion to an outer peripheral side of the peripheral wall portion passing through an insertion opening provided in the peripheral wall portion. A connector disposed on a tip end side of the lead wire is attached to a lower surface side of the holding member. An intermediate portion of the lead wire is disposed on the outer peripheral to intersect an axial direction of the peripheral wall portion.

4 Claims, 15 Drawing Sheets

(56) References Cited

U.S. PATENT DOCUMENTS

| | | | | |
|---|---|---|---|---|
| 2014/0070520 | A1* | 3/2014 | James | B60R 21/20 280/728.2 |
| 2015/0197272 | A1* | 7/2015 | Nonoyama | B62D 1/065 74/552 |
| 2022/0063518 | A1* | 3/2022 | Kim | B60Q 3/283 |
| 2022/0080919 | A1* | 3/2022 | Ko | B60R 21/21656 |
| 2023/0339420 | A1* | 10/2023 | Kutchey | G09F 13/04 |

FOREIGN PATENT DOCUMENTS

| | | | | | |
|---|---|---|---|---|---|
| EP | 0808750 | A1 | * | 11/1997 | B60R 21/21658 |
| EP | 0887239 | A2 | * | 12/1998 | B60R 21/2037 |
| EP | 2915704 | A1 | * | 9/2015 | B60R 21/2037 |
| JP | 2004291870 | A | * | 10/2004 | |
| JP | 2009067132 | A | * | 4/2009 | |
| KR | 20220069519 | A | * | 5/2022 | B60R 21/21656 |
| KR | 20220076903 | A | * | 6/2022 | B60Q 3/20 |
| KR | 102827959 | B1 | * | 7/2025 | B60R 21/203 |
| KR | 102914651 | B1 | * | 1/2026 | B60R 13/005 |
| WO | WO-2007145549 | A1 | * | 12/2007 | B60R 21/21656 |
| WO | WO-2008051117 | A1 | * | 5/2008 | B60Q 5/003 |
| WO | WO-2008079057 | A1 | * | 7/2008 | B62D 1/04 |
| WO | 2023/163325 | A1 | | 8/2023 | |
| WO | WO-2023235520 | A1 | * | 12/2023 | B60R 13/005 |
| WO | WO-2025067588 | A1 | * | 4/2025 | B60R 13/005 |
| WO | WO-2025168489 | A1 | * | 8/2025 | B60R 21/21656 |
| WO | WO-2025202383 | A1 | * | 10/2025 | B60R 13/005 |
| WO | WO-2025202396 | A1 | * | 10/2025 | B60R 21/215 |

* cited by examiner

STEERING DEVICE

This application is based upon and claims the benefit of priority from prior Japanese patent application No. 2024-208725, filed on Nov. 29, 2024, the entire contents of which are incorporated herein by reference.

TECHNICAL FIELD

The present disclosure relates to a steering device having a configuration in which an electronic component is disposed on a pad disposed on an upper side of a boss portion.

BACKGROUND ART

In the related art, there is a steering device having a configuration in which, as an electronic component, a decorative body (emblem) capable of emitting light at a predetermined time is disposed on a ceiling wall portion of a pad disposed on a driver side. In the steering device, a lead wire extending from an arrangement region for the decorative body in the ceiling wall portion is inserted through an opening formed in a peripheral wall portion of the pad to be exposed to an outer peripheral side of the peripheral wall portion, and extends downward on the outer peripheral side of the peripheral wall portion (extends along an axial direction of the outer peripheral wall portion) and a connector provided on a tip end side is fixed to a lower surface side of a bag holder which is a holding member holding the pad (for example, see WO2023/163325).

SUMMARY OF INVENTION

In the related-art steering device, since the lead wire extending from the decorative body is disposed to simply extend along the axial direction of the peripheral wall portion on the outer peripheral side of the peripheral wall portion, and the connector on the tip end side is fixed to the lower surface side of the bag holder, an arrangement position of the connector in the bag holder is limited, in other words, an arrangement position of the decorative body (electronic component) on the pad is also limited to some extent.

Further, in consideration of such a point, it is conceivable to change the arrangement position of the connector by disposing the lead wire on the lower surface side of the bag holder along a lower surface of the bag holder, but since other components and the like are arranged close to each other, there is a problem in securing a sufficient arrangement space.

Aspects of the present disclosure relates to providing a steering device having a high degree of freedom in an arrangement position of an electronic component on a pad.

According to an aspect of the present disclosure, there is provided a steering device including:

a steering body;

a pad disposed on an upper side of a boss portion;

a holding member disposed on a lower surface side of the pad to hold the pad and attached to a steering body side; and an electronic component disposed on the pad and electrically connected to a control device provided on a vehicle body side, in which the pad includes a ceiling wall portion disposed on a driver side and a peripheral wall portion extending downward in a tubular shape from a vicinity of a peripheral edge of the ceiling wall portion, a lead wire extending from an arrangement region for the electronic component in the ceiling wall portion extends from a back surface side of the ceiling wall portion to an outer peripheral side of the peripheral wall portion passing through an insertion opening provided in the peripheral wall portion, a connector disposed on a tip end side of the lead wire is attached to a lower surface side of the holding member, and an intermediate portion of the lead wire is disposed on the outer peripheral side of the peripheral wall portion to intersect an axial direction of the peripheral wall portion.

In the steering device according to the present disclosure, since the intermediate portion of the lead wire extending from the arrangement region for the electronic component is disposed on the outer peripheral side of the peripheral wall portion of the pad to intersect the axial direction of the peripheral wall portion, the connector on the tip end side can be easily disposed in the holding member at a position separated from below the electronic component. That is, in the steering device according to the present disclosure, a degree of freedom in an arrangement position of the connector in the holding member is high, in other words, an arrangement position of the electronic component on the pad is also not affected by the arrangement position of the connector.

Therefore, in the steering device according to the present disclosure, a degree of freedom in the arrangement position of the electronic component on the pad is high.

Further, in the steering device according to the present disclosure, when the holding portion capable of holding the intermediate portion of the lead wire is disposed on the outer peripheral surface side of the peripheral wall portion, the intermediate portion of the lead wire can be prevented from moving with respect to the peripheral wall portion by holding the intermediate portion by the holding portion, and handling workability when the pad is held by the holding member or the like is improved, which is preferable.

Further, in the steering device according to the present disclosure, the pad may be configured to cover a folded airbag, the holding member may be implemented by a bag holder that holds the airbag, on the outer peripheral surface side of the peripheral wall portion, a strength reinforcing rib may be formed substantially along the axial direction of the peripheral wall portion while protruding outward, and as the holding portion, a holding recess portion in which the intermediate portion may be able to be inserted and held is formed by recessing the rib.

When the steering device is configured as described above, in the configuration in which the strength reinforcing rib is disposed on the outer peripheral surface side of the peripheral wall portion to protrude, the holding recess portion in which the lead wire can be inserted and held is provided on the rib, which also prevents the intermediate portion of the lead wire from passing outside the rib and floating from the peripheral wall portion. Therefore, an increase in an outer diameter dimension of the peripheral wall portion including the lead wire (a width dimension of the peripheral wall portion in a direction orthogonal to the axial direction) can be prevented.

Further, in the steering device according to the present disclosure, the holding recess portion may be disposed on a lower end side of the rib to open downward, and a side wall portion of the bag holder may be disposed to cover outside the peripheral wall portion and extend to at least a vicinity of a lower end of the rib.

In the steering device having the above configuration, since the holding recess portion is disposed on the lower end side of the rib to open downward, in other words, since the holding recess portion is formed along a mold removal direction when the pad is molded, an increase in manufacturing cost of the pad can be prevented. Further, since the side wall portion of the bag holder disposed to cover the outside of the peripheral wall portion of the pad is disposed to extend to at least the vicinity of the lower end of the rib, even if the lead wire is separated from the holding recess portion that opens downward, the outer peripheral side of the lead wire can be pressed by the side wall portion of the bag holder, and the lead wire can be effectively prevented from separating from the peripheral wall portion.

BRIEF DESCRIPTION OF DRAWINGS

Exemplary embodiment(s) of the present invention will be described in detail based on the following figures, wherein.

DESCRIPTION OF EMBODIMENTS

Figure 1:
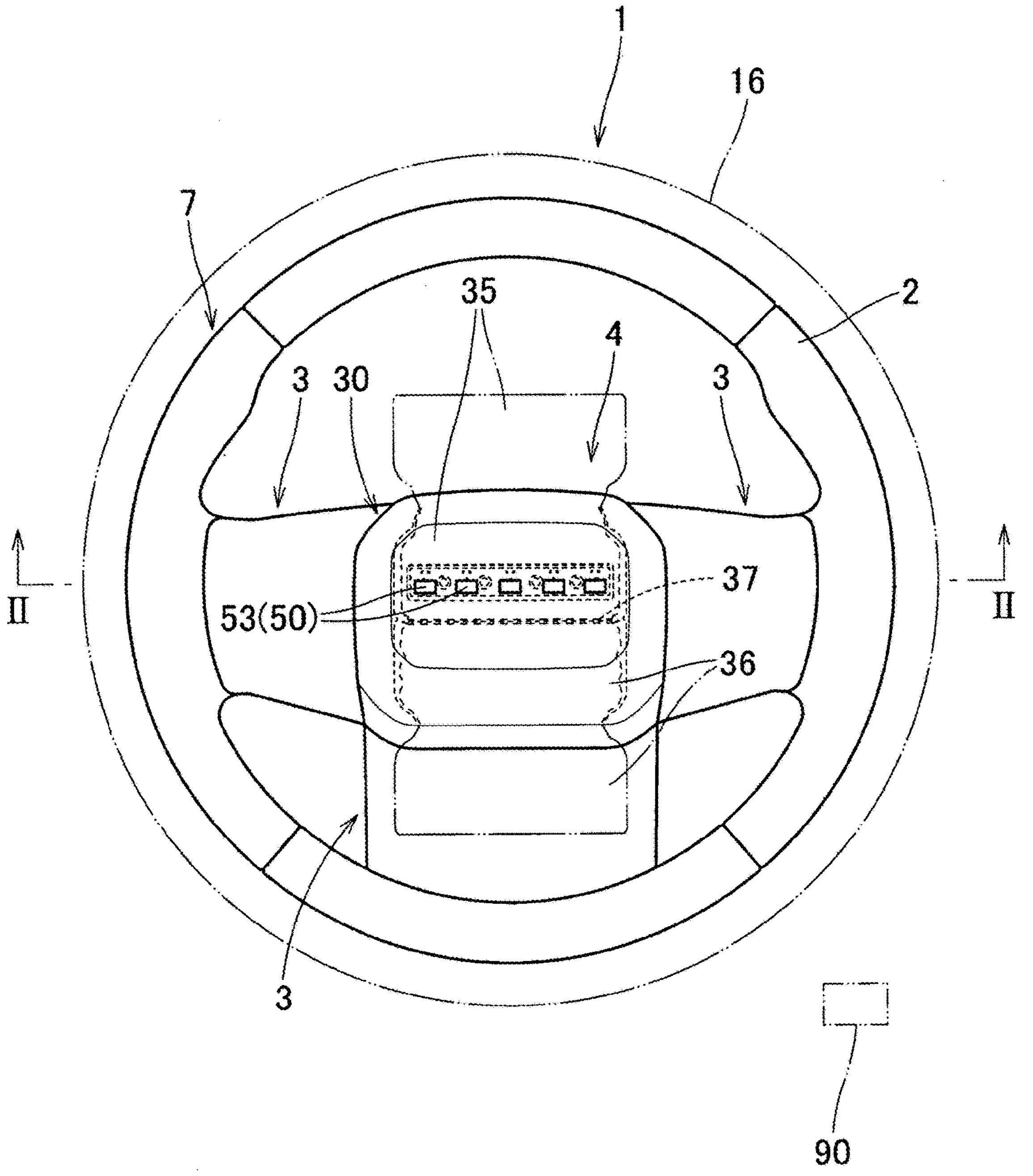
FIG. 1 is a plan view of a steering wheel (steering device) that is an embodiment of the present disclosure.
Figure 2:
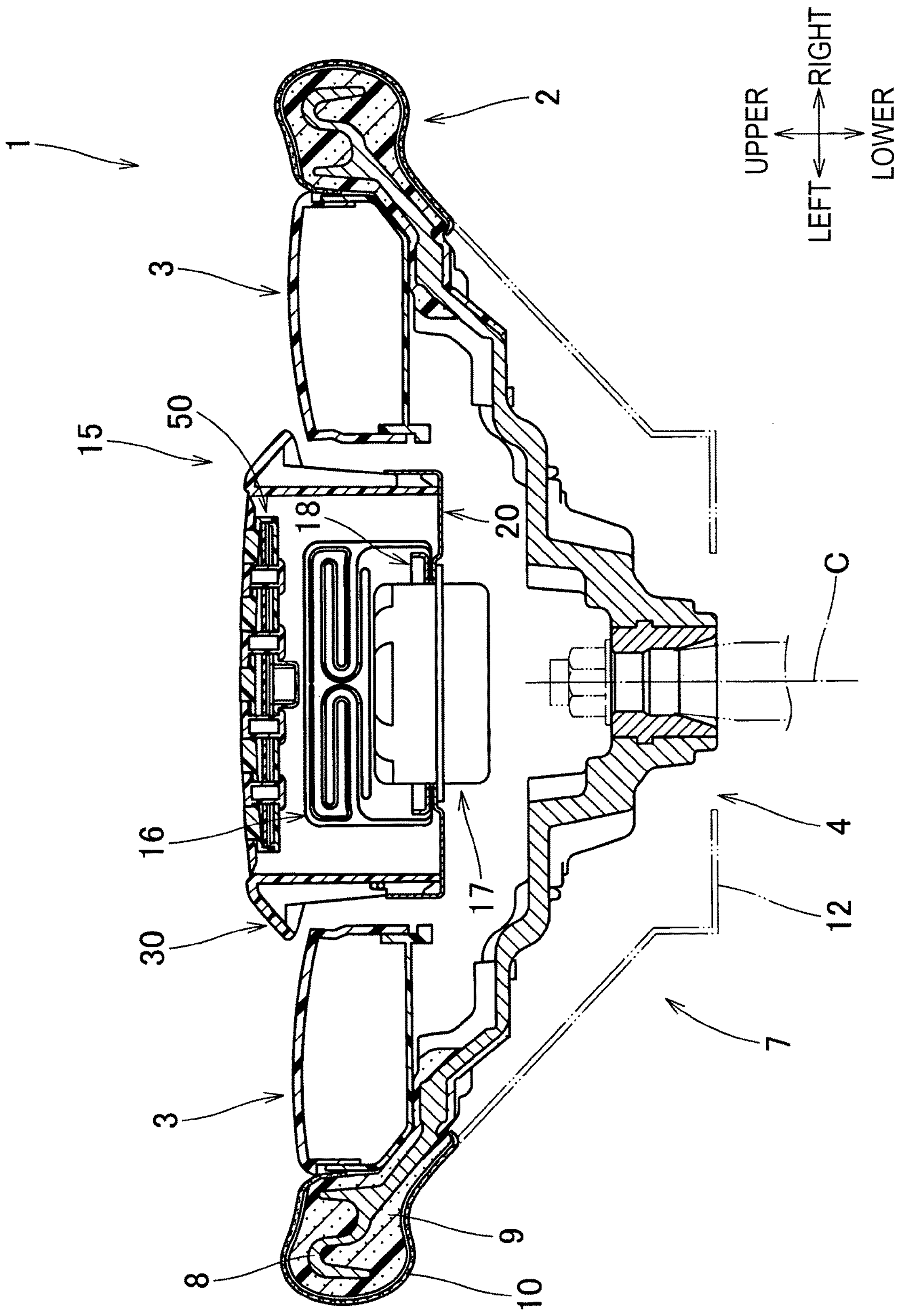
FIG. 2 is a schematic cross-sectional view of the steering wheel of the embodiment taken along line II-II in FIG. 1.

Hereinafter, an embodiment of the present disclosure will be described with reference to the drawings. In the embodiment, a steering wheel 1 including an annular ring portion 2 (grip portion) will be described as an example of the steering device. In the embodiment, as shown in FIG. 1, the steering wheel 1 includes the annular ring portion 2 that is gripped during rotation steering, a boss portion 4 that is disposed substantially at a center of the ring portion 2, and a plurality of (three in the embodiment) spoke portions 3 that connect the ring portion 2 and the boss portion 4. As shown in FIGS. 1 and 2, the steering wheel 1 includes, as constituent components, a steering wheel body 7 and an airbag device 15 disposed above the boss portion 4.

In the present description, regarding front, rear, upper, lower, left, and right directions, unless otherwise specified, with reference to a straight steering state of the steering wheel 1 mounted on a vehicle, a direction along a rotation axis C (see FIG. 2) of the ring portion 2 is defined as an upper-lower direction, a direction orthogonal to the rotation axis C of the ring portion 2 and along a front-rear direction of the vehicle is defined as a front-rear direction, and a direction orthogonal to the rotation axis C of the ring portion 2 and along a left-right direction of the vehicle is defined as a left-right direction.

As shown in FIG. 2, the steering wheel body 7 as a steering body includes a core metal 8 disposed to connect the ring portion 2, the boss portion 4, and the spoke portions 3, a coating layer 9 covering peripheries of the ring portion 2 and the spoke portions 3 in the core metal 8, a skin layer 10 covering an outer peripheral side of the coating layer 9, and a lower cover 12 covering a lower surface side of the boss portion 4. The core metal 8 is made of a metal such as an aluminum alloy. The coating layer 9 is made of a soft foamed material such as foamed polyurethane. The skin layer 10 is formed by a sheet body made of a synthetic resin or leather such as natural leather, synthetic leather, or artificial leather. The lower cover 12 is shown by a two-dot chain line without being shown in detail, and is made of synthetic resin.

Figure 3:
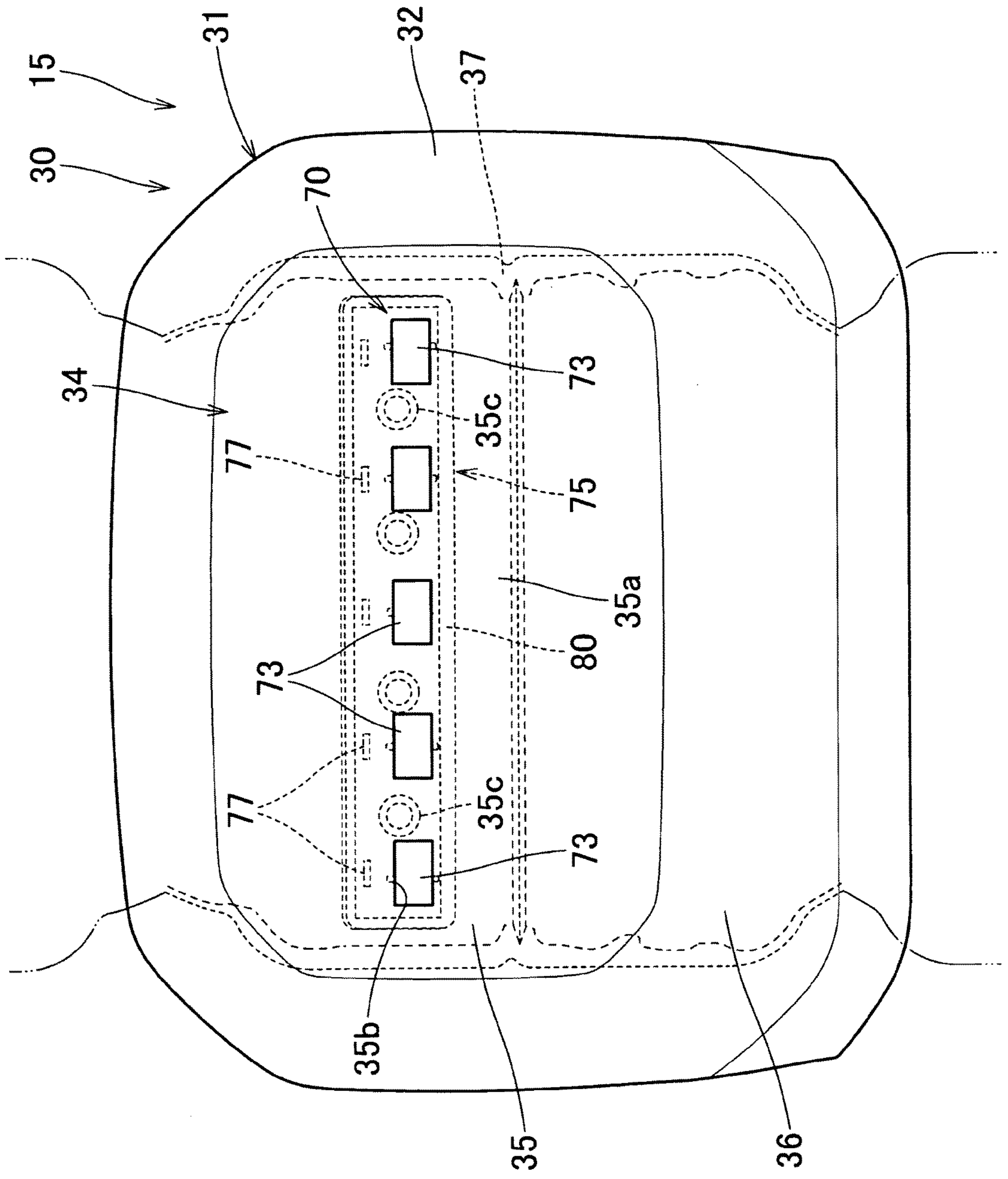
FIG. 3 is a plan view of an airbag device in the steering wheel of the embodiment.
Figure 8:
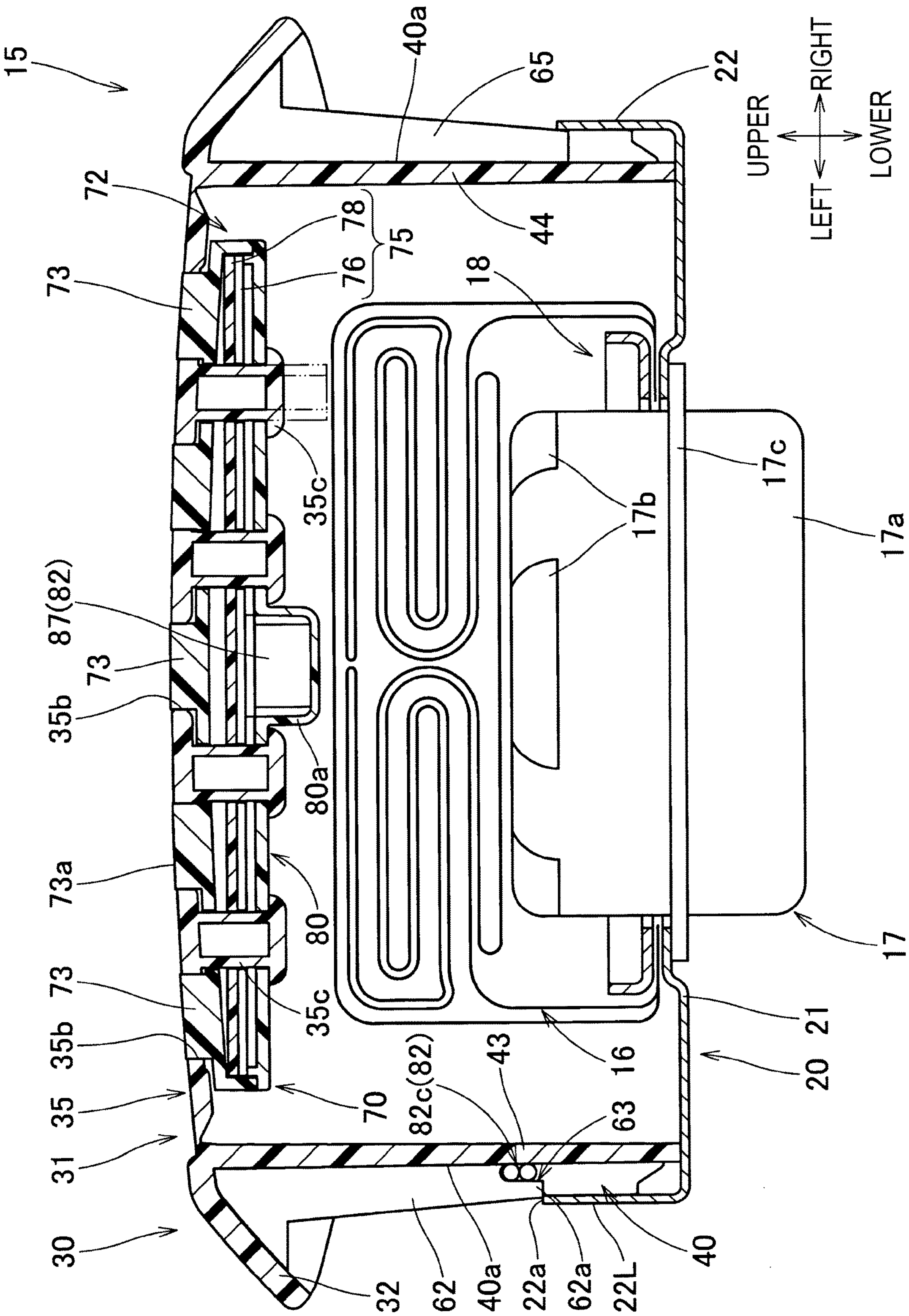
FIG. 8 is a schematic enlarged longitudinal cross-sectional view of the airbag device of FIG. 3 in a left-right direction.

As shown in FIGS. 3 and 8, the airbag device 15 includes an airbag 16 that is folded and stored, an inflator 17 that supplies inflation gas to the airbag 16, a pad (airbag cover) 30 that is disposed on an upper side of the boss portion 4 and covers the folded airbag 16, a decorative body 70 as an electronic component provided on the pad 30, a bag holder 20 as a holding member that holds the airbag 16, the inflator 17, and the pad 30, and a retainer 18 for attaching the airbag 16 and the inflator 17 to the bag holder 20.

The airbag 16 is set into a bag shape formed of a flexible sheet body, and although not shown in detail, a fully inflated shape with the inflation gas flowing inside is set into a substantially disk shape capable of covering substantially an entire upper surface of the ring portion 2 (see a two-dot chain line in FIG. 1).

The inflator 17 includes a substantially columnar main body portion 17*a* provided, in an upper portion thereof, with a plurality of gas discharge ports 17*b* for discharging the inflation gas, and a flange portion 17*c* protruding from an outer peripheral surface of the main body portion 17*a*. Although not shown in detail, the inflator 17 is also electrically connected to a control device 90 provided on a vehicle body side.

The retainer 18 is made of a substantially rectangular annular sheet metal, and includes bolts 18*a* (see FIG. 4) at four corners. The retainer 18 is disposed in the airbag 16, and although not shown in detail, the airbag 16 and the inflator 17 are attached to the bag holder 20 by causing the bolts 18*a* protruding downward to sequentially pass through the airbag 16, a bottom wall portion 21 (to be described later) of the bag holder 20, and the flange portion 17*c* of the inflator 17, and fastening nuts 19 (see FIG. 4) to the bolts 18*a* protruding from the respective flange portion 17*c*.

Figure 4:
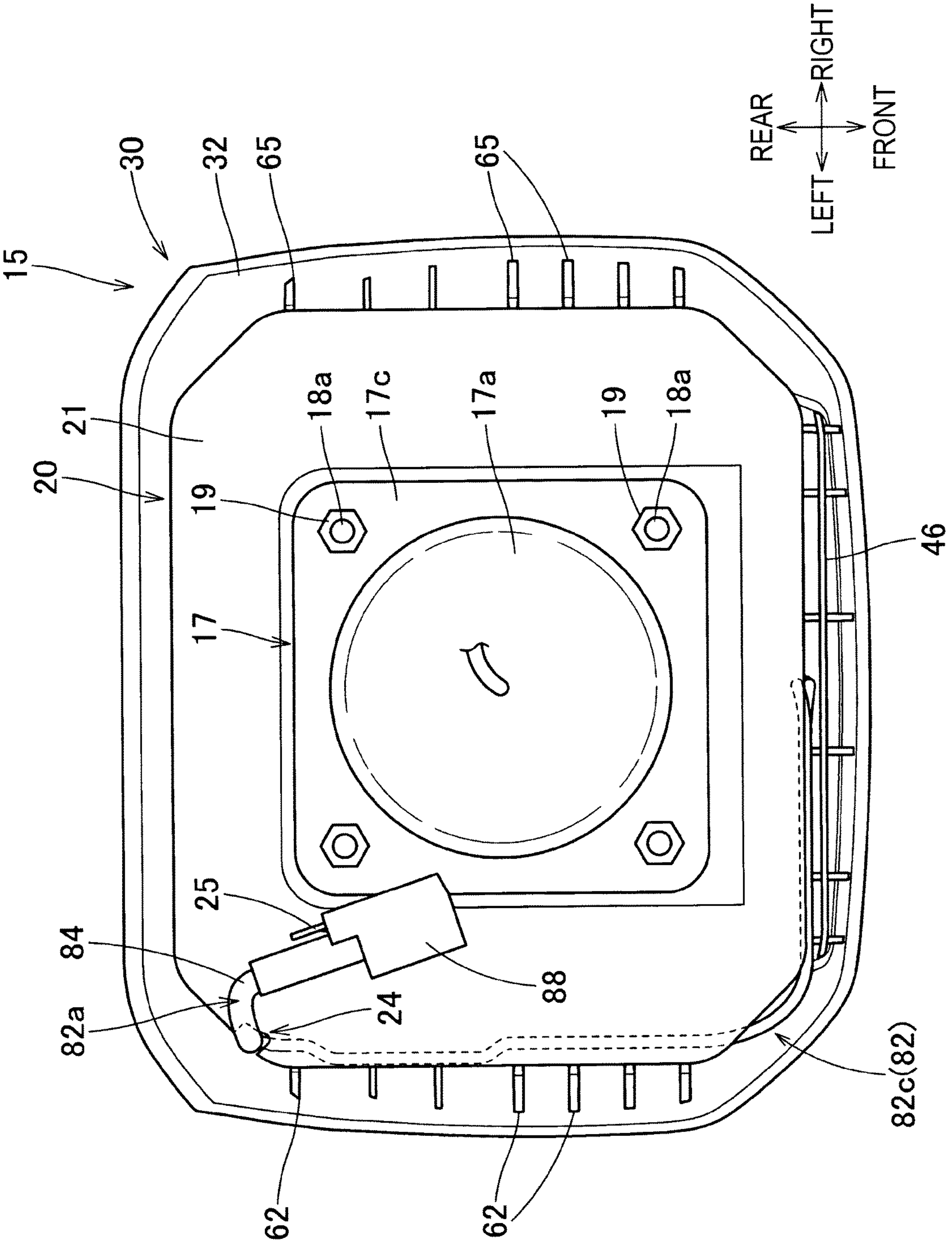
FIG. 4 is a bottom view of the airbag device of FIG. 3.
Figure 5:
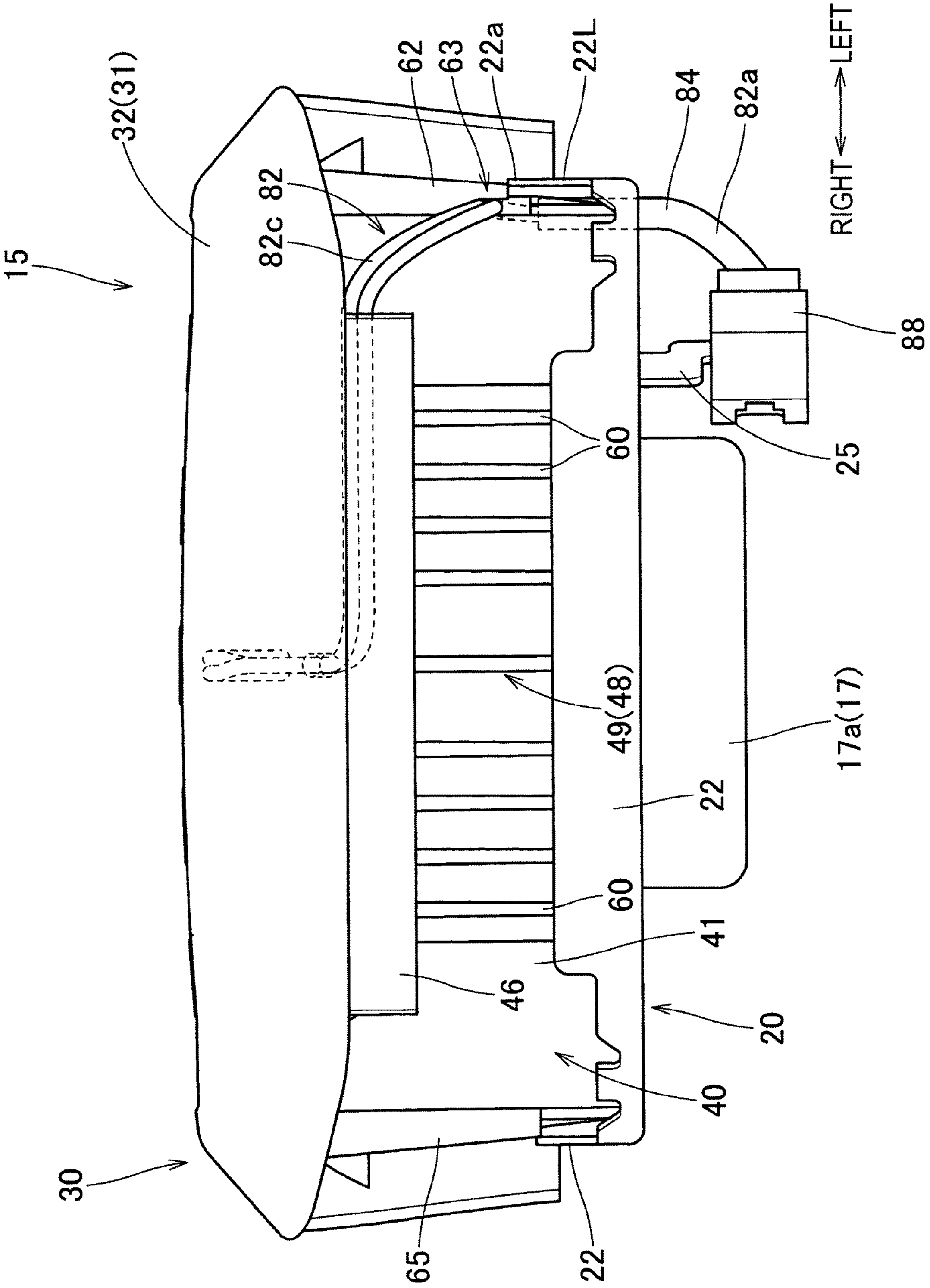
FIG. 5 is an enlarged front view of the airbag device of FIG. 3.
Figure 6:
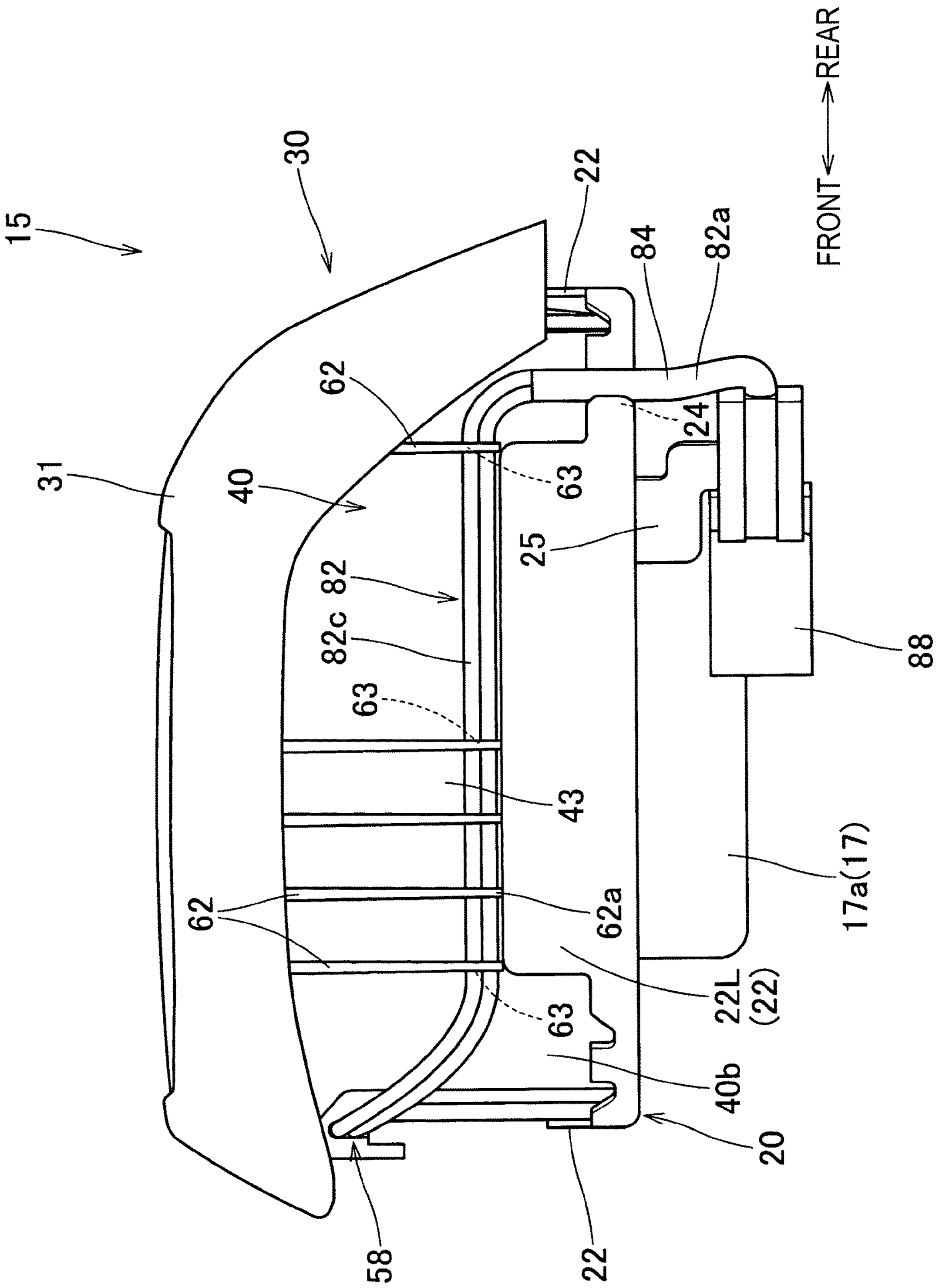
FIG. 6 is an enlarged left side view of the airbag device of FIG. 3.
Figure 7:
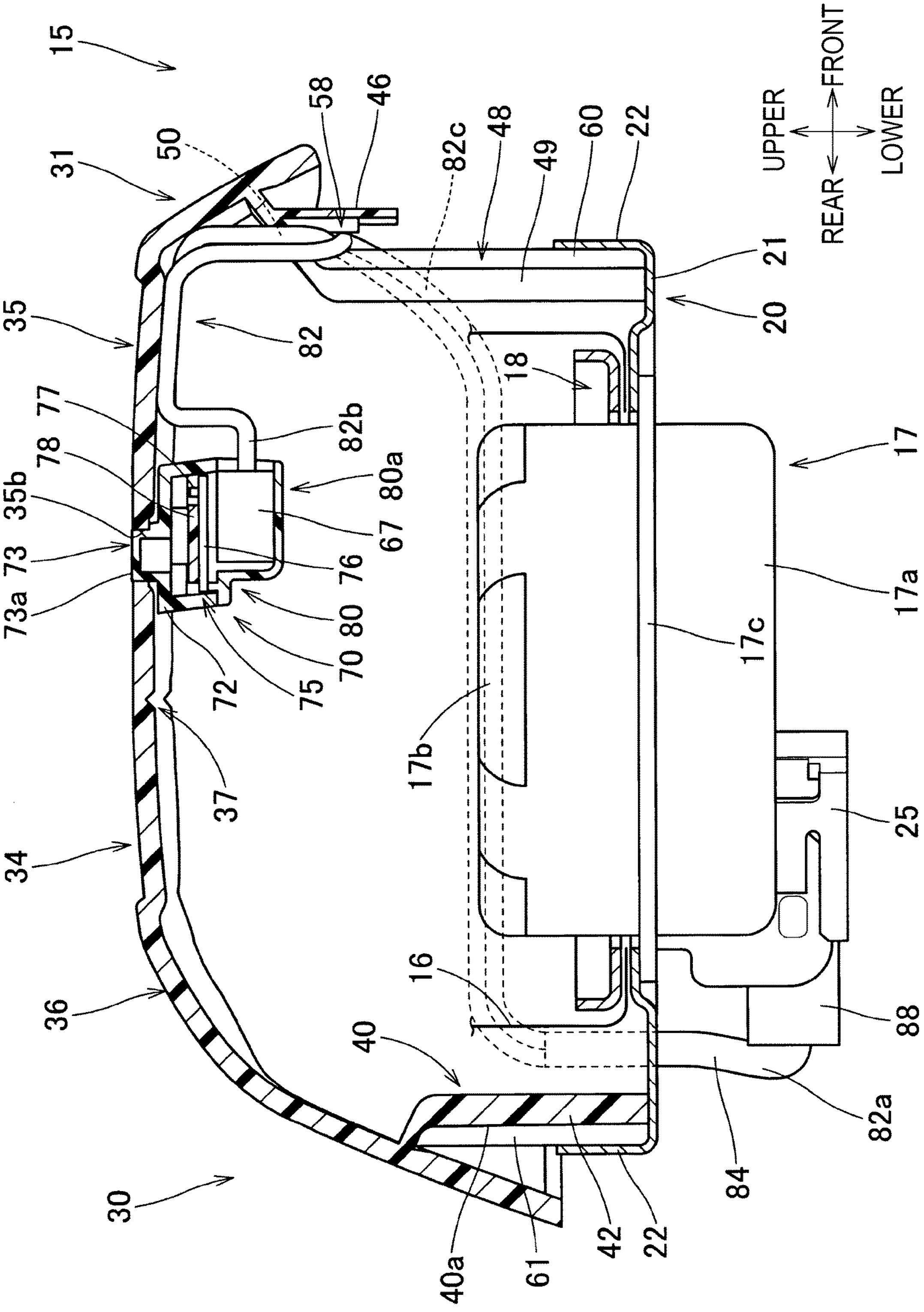
FIG. 7 is a schematic enlarged longitudinal cross-sectional view of the airbag device of FIG. 3 in a front-rear direction.
Figure 15:
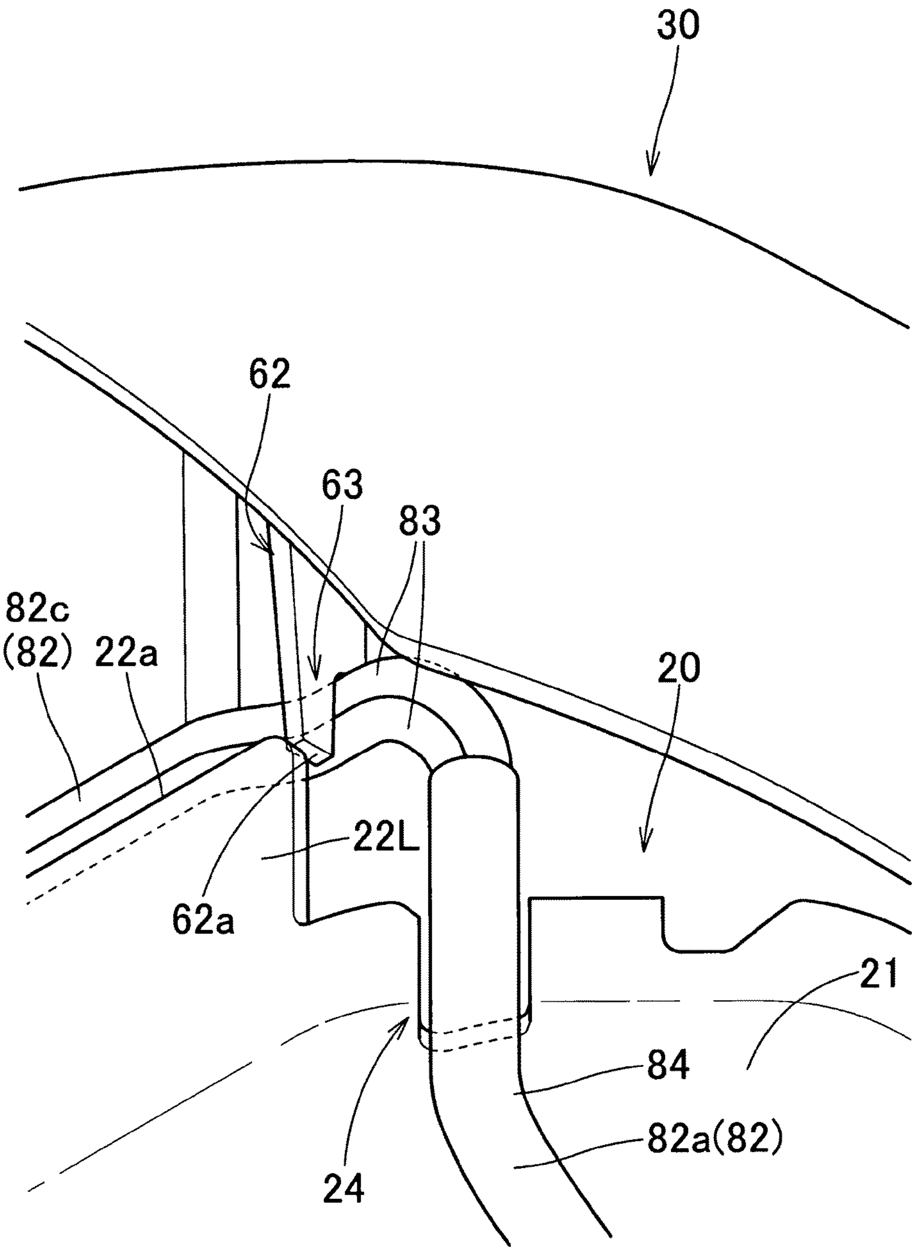
FIG. 15 is a partially enlarged perspective view showing a region on a left rear end side of the bag holder in the airbag device of FIG. 3.

The bag holder 20 as the holding member is made of sheet metal in the embodiment, holds the airbag 16, the inflator 17, and the pad 30, and attaches the airbag device 15 to a steering wheel body 7 side using a horn switch unit (not shown), as shown in FIG. 2. Specifically, as shown in FIGS. 7 and 8, the bag holder 20 includes a substantially rectangular bottom wall portion 21 to which the airbag 16 and the inflator 17 are attached using the retainer 18, and side wall portions 22 which are disposed to extend upward from a peripheral edge of the bottom wall portion 21, and holds the pad 30 by connecting a predetermined portion of the side wall portion 22 to a peripheral wall portion 40 of the pad 30 using rivets or the like (not shown). As shown in FIGS. 5 to 8, the side wall portions 22 are disposed at four locations on the outer peripheral edge of the bottom wall portion 21, which are regions excluding the vicinities of four corners, and are disposed to extend upward on the outer peripheral side of the peripheral wall portion 40 of the pad 30. In the steering wheel 1 of the embodiment, a left side wall portion 22L covering a left side of the peripheral wall portion 40 of the pad 30 is disposed to extend to a vicinity of a lower end 62*a* of a rib 62 (to be described later) disposed on a left wall portion 43 (to be described later) of the peripheral wall portion 40 (to bring an upper end 22*a* close to the lower end 62*a* of the rib 62) (see FIGS. 5, 6, 8, and 15). Further, in the bag holder 20 of the embodiment, in a vicinity of a corner portion on a left rear side, as shown in FIGS. 4 and 15, an insertion recess portion 24 through which the lead wire 82 (to be described later) extending from the decorative body 70 disposed on the pad 30 can be inserted is formed by cutting out the corner portion. The insertion recess portion 24 has an opening width dimension that allows insertion of a portion on a tip end 82*a* side (connector 88 side) of the lead wire 82 whose outer peripheral side is covered with a protective tube 84 made of an elastic body together with the protective tube 84, and a depth of the recess is set to a dimension that allows the entire lead wire 82 to be inserted into an inside. That is, in the steering wheel 1 of the embodiment, a portion of the lead wire 82 in a vicinity of a tip end 82*a* is locked in a vicinity of a left rear end of the bag holder 20. Further, in the bag holder 20 of the embodiment, a locking protruding piece 25 capable of locking a connector 88 disposed on the tip end 82*a* side of the lead wire 82 is formed on a lower surface side in the vicinity of the left rear end which is the vicinity of the insertion recess portion 24 in the bottom wall portion 21 (see FIG. 4). As shown in FIGS. 5 to 7, the locking protruding piece 25 is formed to protrude downward from the bottom wall portion 21. The pad 30 is disposed on the upper side of the boss portion 4, and as shown in FIGS. 7 and 8, is configured to cover the folded airbag 16 from an upper side to a lateral side. The pad 30 is made of soft synthetic resin, and is made of polyolefin-based thermoplastic elastomer (TPO) in the embodiment. Specifically, the pad 30 is formed using TPO colored in a dark color such as black as a base material. The pad 30 includes a ceiling wall portion 31 that is disposed on an upper side that is a driver side and covers the upper side of the folded airbag 16, and the peripheral wall portion 40 that extends in a tubular shape from a vicinity of a peripheral edge of the ceiling wall portion 31 and covers front, rear, left, and right sides of the folded airbag 16 (see FIGS. 7 to 9).

The ceiling wall portion 31 includes a door arrangement portion 34 constituted by a region inside the peripheral wall portion 40 and a peripheral edge portion 32 constituted by a region outside the peripheral wall portion 40. Inside the region of the door arrangement portion 34, a front door portion 35 that opens forward and a rear door portion 36 that opens rearward are arranged (see FIGS. 1 and 3). A breakable portion 37 that can be broken when the airbag 16 is inflated is disposed around the front door portion 35 and the rear door portion 36. In the embodiment, the breakable portion 37 is formed by notching the ceiling wall portion 31 from a back surface side (lower surface side), and specifically, is configured by continuously arranging notches each having a V-shaped cross section (see FIG. 7).

In the ceiling wall portion 31, the decorative body 70 as the electronic component is disposed in the front door portion 35. In the embodiment, as shown in FIGS. 3, 7 and 8, the decorative body 70 is disposed in a region on a back surface side on a rear edge 35*a* side in the front door portion 35, which is a region wide in the left-right direction. In the front door portion 35, a through hole portions 35*b* through which respective protrusion portions 73 formed on a surface (upper surface) side of a main body portion 72 of the decorative body 70 (to be described later) can penetrate, and coupling protrusions 35*c* for coupling the decorative body 70 to the pad 30 are formed (see FIGS. 3 and 8). The through hole portion 35*b* is formed to be opened corresponding to an outer shape of the protrusion portion 73 to allow the protrusion portion 73 to penetrate therethrough, in the embodiment, the outer shape when viewed from above is a substantially rectangular shape, and five through hole portions 35*b* are arranged side by side in the left-right direction (see FIG. 3). As shown in FIG. 3, the coupling protrusions 35*c* are disposed at four locations between the protrusion portions 73 (between the through hole portions 35*b*) when the pad 30 is viewed from above. As shown in FIG. 8, the coupling protrusions 35*c* penetrate the entire decorative body 70 in a state of being disposed on the back surface side of the front door portion 35 such that the protrusion portions 73 penetrate the through hole portions 35*b*, and the lower end side of the decorative body 70 protruding from a holding member 80 (to be described later) is melted, thereby coupling the decorative body 70 to the pad 30 (front door portion 35). The outer shape of the coupling protrusion 35*c* before melting is a cylindrical shape, as indicated by a two-dot chain line in FIG. 8.

Figure 9:
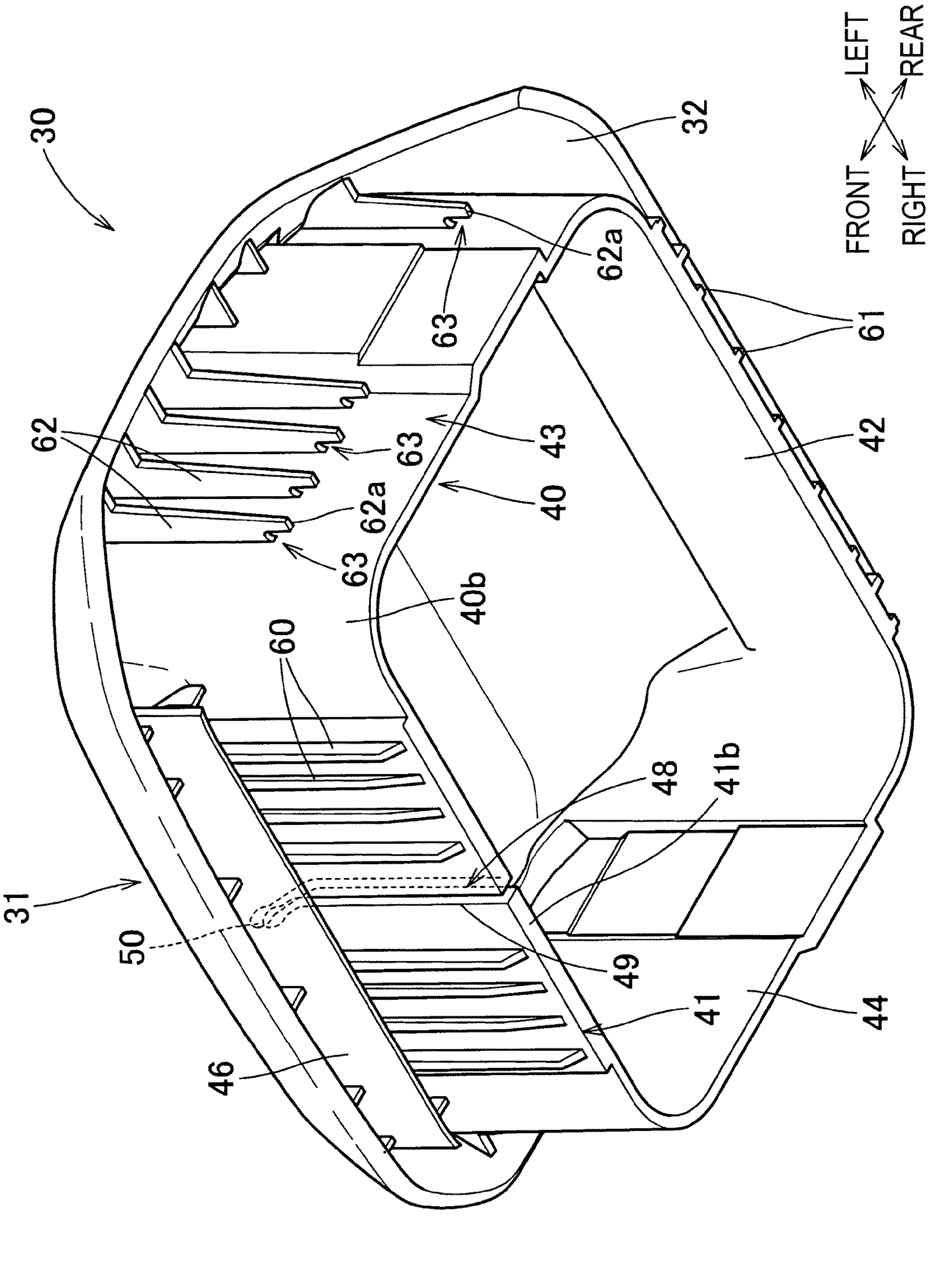
FIG. 9 is a schematic perspective view of a pad in the steering wheel of the embodiment.

In the embodiment, as shown in FIGS. 7 to 9, the peripheral wall portion 40 has a rectangular cylindrical shape, and a tip end surface (lower end surface) is positioned in a vicinity of an upper surface of the bottom wall portion 21 of the bag holder 20 and an outer peripheral side in a vicinity of a lower end is covered by the side wall portion 22 of the bag holder 20. The peripheral wall portion 40 includes a front wall portion 41 and a rear wall portion 42 facing each other in the front-rear direction, and the left wall portion 43 and a right wall portion 44 facing each other in the left-right direction.

In the front wall portion 41 of the peripheral wall portion 40, a slit 48 is formed as an insertion opening through which the lead wire 82 extending from the decorative body 70 is inserted. Specifically, the slit 48 is formed in a region (a region that covers a front of the airbag 16) in a vicinity of a base end when the front door portion 35 is opened, and at a position of a substantially center of the front wall portion 41 in the left-right direction (see FIG. 9). The slit 48 is formed by cutting out the front wall portion 41 from a lower end 41*b* side to extend along the upper-lower direction. In the embodiment, on an upper end 41*a* side of the front wall portion 41, an inclined portion 45 inclined to extend outward (forward) and upward is disposed such that a tip end thereof is connected to a back surface side of the peripheral edge portion 32 (see FIG. 11). As shown in FIGS. 9 to 12, the slit

Figure 10:
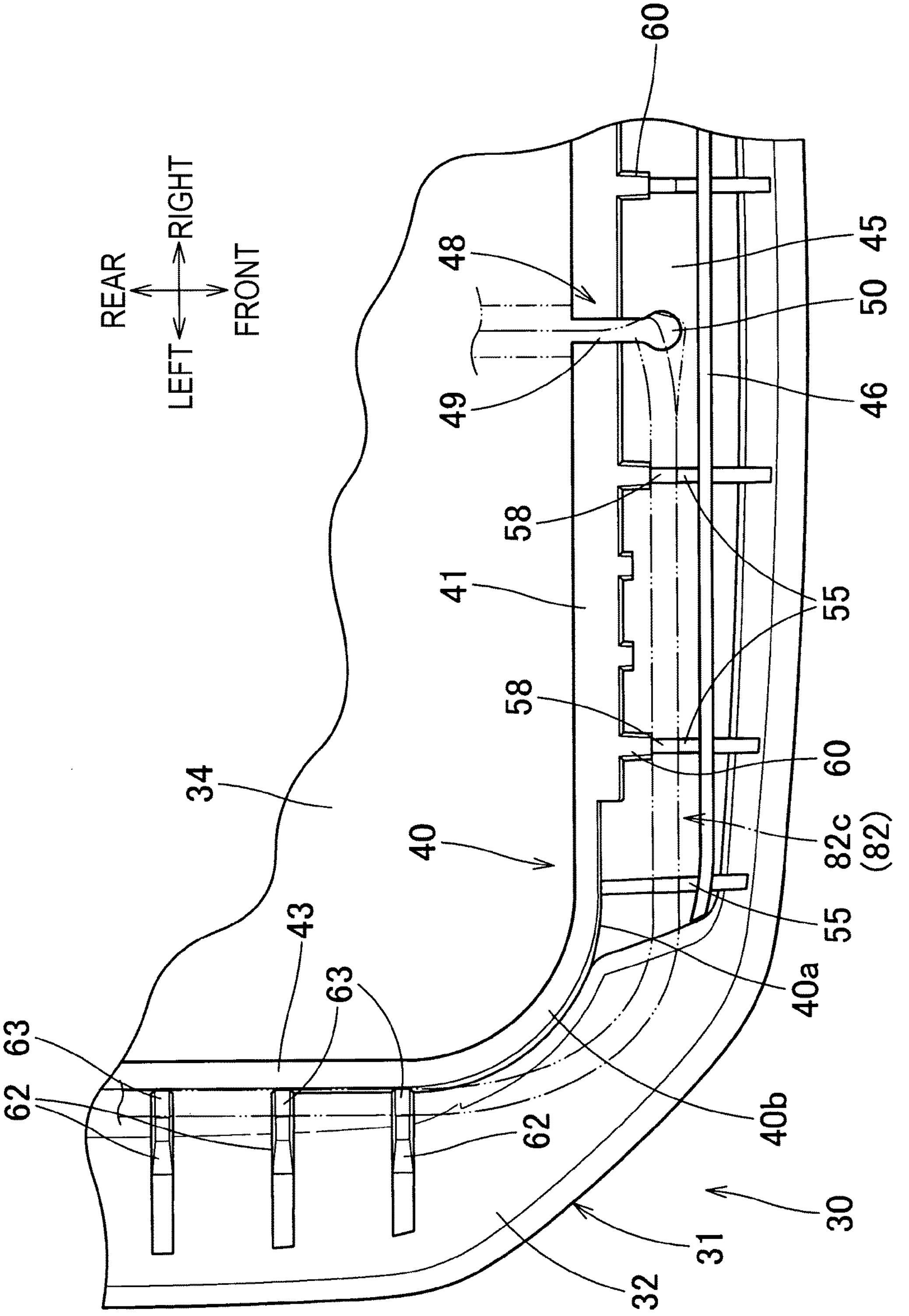
FIG. 10 is a partially enlarged bottom view of the pad of FIG. 9.
Figure 11:
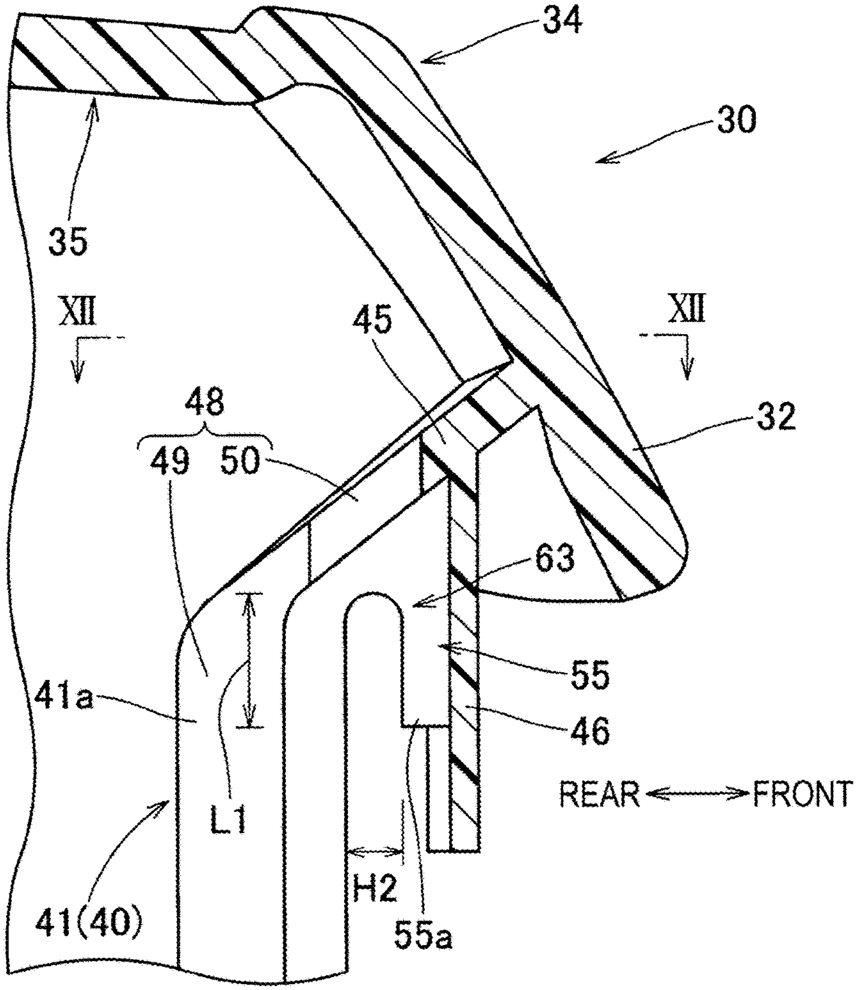
FIG. 11 is a partially enlarged longitudinal cross-sectional view showing a slit in the pad of FIG. 9.
Figure 12:
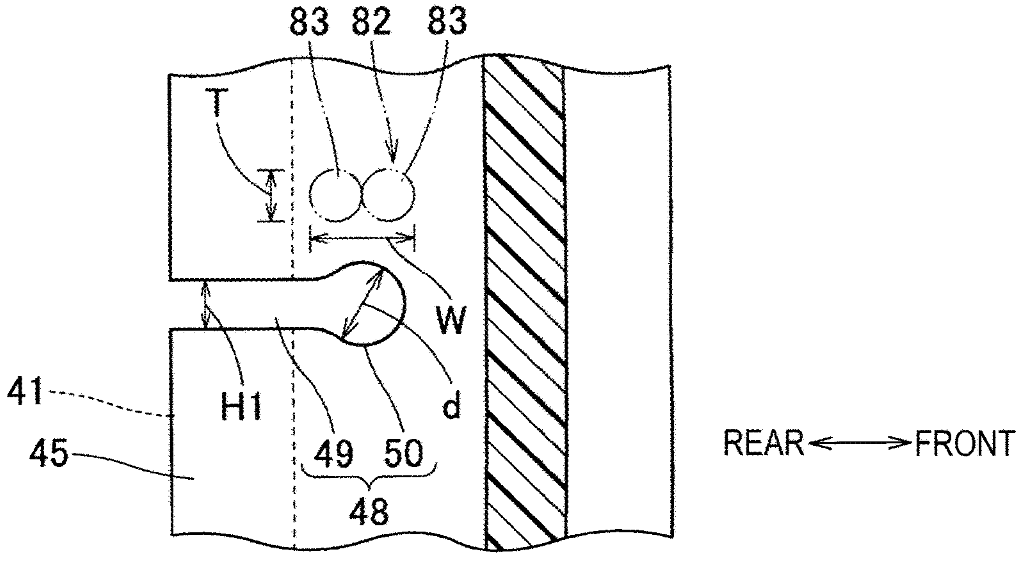
FIG. 12 is a cross-sectional view taken along line XII-XII in FIG. 11.
Figure 14:
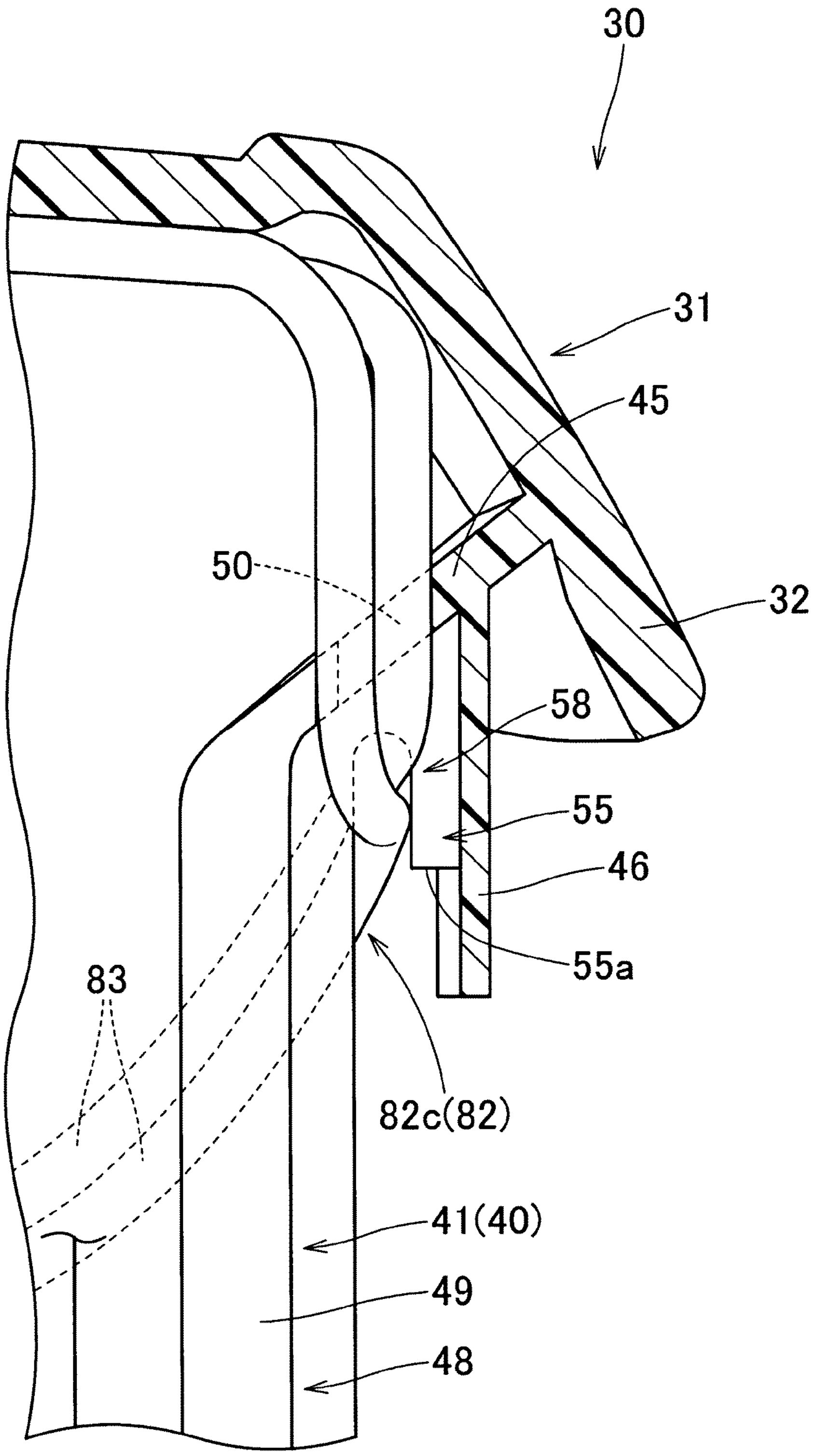
FIG. 14 is a schematic partially enlarged longitudinal cross-sectional view showing a vicinity of the slit in the airbag device of FIG. 3.

48 is continuously formed from a lower end 41*b* of the front wall portion 41 to the inclined portion 45. The slit 48 includes a general portion 49 cut out in a groove shape, and a round hole portion 50 formed on an upper end side of the general portion 49. The round hole portion 50 is disposed in a region of the inclined portion 45 (specifically, a substantially center of the inclined portion 45 in the front-rear direction). An inner diameter dimension d of the round hole portion 50 is set to be larger than an opening width dimension H1 of the general portion 49 (see FIG. 12). In the embodiment, the lead wire 82 extending from the decorative body 70 has a flat shape in which two linear bodies 83, 83 are arranged side by side as indicated by a two-dot chain line in FIG. 12. In the embodiment, the opening width dimension H1 of the general portion 49 in the slit 48 is set to be substantially equal to a thickness dimension T of the lead wire 82, and the inner diameter dimension d of the round hole portion 50 is set to be larger than the thickness dimension T of the lead wire 82 and smaller than a width dimension W of the lead wire 82 (see FIG. 12). Then, the lead wire 82 is disposed to be inserted into the round hole portion 50 formed in the inclined portion 45 while being inserted through the general portion 49 by slightly bending an insulator tube (reference numeral omitted) covering the outer peripheral side, and bent below the round hole portion 50 (see a two-dot chain line in FIG. 10 and FIG. 14). During the insertion into the slit 48, the lead wire 82 is inserted into the round hole portion 50 formed in the inclined portion 45 inclined with respect to the front wall portion 41, and thereby entering the general portion 49 is prevented and coming off from the slit 48 (general portion 49) is prevented. Further, since the opening width dimension H1 of the general portion 49 is set to be substantially equal to the thickness dimension T of the lead wire 82, the lead wire 82 hardly moves downward in the general portion 49 due to a frictional force generated between an inner peripheral edge of the slit 48 (general portion 49) and an outer surface (outer surface of the insulator tube), and hardly comes off. Further, in front of the front wall portion 41, a cover portion 46 that covers a front of the upper end 41*a* of the front wall portion 41 is disposed over an entire region of the front wall portion 41 in the left-right direction (see FIGS. 4, 5, 9, 11 and 14). The cover portion 46 is formed to extend downward from an intermediate portion of the inclined portion 45 in the front-rear direction, and specifically, is formed to extend downward at a position in front of the round hole portion 50 in the slit 48 (see FIG. 11). Between the front wall portion 41 and the cover portion 46, coupling ribs 55 that couple the front wall portion 41 and the cover portion 46 are disposed with each being set into a plate shape along the front-rear direction (see FIG. 10). Since each of the coupling ribs 55 is disposed to couple the front wall portion 41 and the cover portion 46 (in other words, protrudes outward from an outer peripheral surface of the front wall portion 41) while extending downward from the inclined portion 45, and is disposed at three locations in a region on a left side of the slit 48 as shown in FIG. 10. On a lower end 55*a* side of each coupling rib 55, guide recess portions 58 (holding portions) into each of which the lead wire 82 (intermediate portion 82*c*) protruding from the slit 48 is inserted to be held and guided are formed (see FIG. 14). Each of the guide recess portions 58 is formed by recessing the corresponding coupling rib 55 upward from the lower end 55*a* side, and specifically, is formed such that a position thereof in the front-rear direction substantially coincides with a position of the round hole portion 50 in the slit 48 (see FIGS. 10 and 11). The guide recess portion 58 has an opening width dimension H2 substantially equal to the thickness dimension T of the lead wire 82 and a length dimension (depth) L1 slightly larger than the width dimension W of the lead wire 82 (see FIG. 11). The guide recess portion 58 is also configured to, when the insulator tube (reference numeral omitted) covering the outer peripheral side is slightly bent and inserted inside the guide recess portion 58, hold the lead wire 82 using a frictional force generated between an inner peripheral edge and the outer surface of the lead wire 82 (the outer surface of the insulator tube). The intermediate portion 82*c* of the lead wire 82 is inserted into and held by each guide recess portion 58, and disposed to extend leftward on a front surface side of the front wall portion 41 (to intersect (be orthogonal to) an axial direction of the peripheral wall portion 40) (see FIGS. 4 and 5 and a two-dot chain line FIG. 10).

Strength reinforcing ribs 60, 61, 62, 65 are formed on an outer peripheral surface 40*a* side of the peripheral wall portion 40 of the pad 30 to protrude outward (see FIGS. 7 to 9). Each of the ribs 60, 61, 62, 65 has a thin plate shape protruding outward, and a plurality of ribs 60, a plurality of ribs 61, a plurality of ribs 62 and a plurality of ribs 65 are disposed substantially along the axial direction of the peripheral wall portion 40 (substantially along the upper-lower direction) on the front wall portion 41, the rear wall portion 42, the left wall portion 43, and the right wall portion 44, respectively. Specifically, in the embodiment, the ribs 60, 61 disposed on the front wall portion 41 and the rear wall portion 42 are disposed to extend to lower end sides of the front wall portion 41 and the rear wall portion 42 (see FIG. 7), and the ribs 62, 65 disposed on the left wall portion 43 and the right wall portion 44 are disposed such that tip ends (lower ends) thereof are positioned at intermediate portions (specifically, slightly lower than a center in the upper-lower direction) of the left wall portion 43 and the right wall portion 44 in the upper-lower direction (see FIG. 8).

Figure 13:
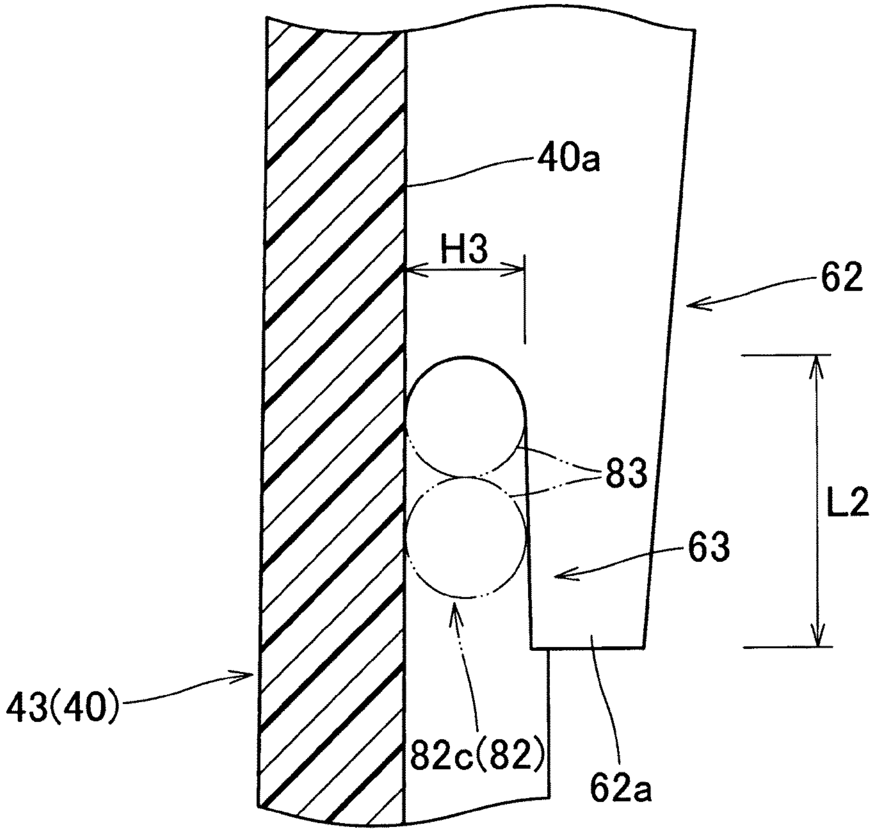
FIG. 13 is a partially enlarged longitudinal cross-sectional view showing a rib provided on a left wall portion in the pad of FIG. 9.

In the embodiment, in each of the ribs 62 disposed on the left wall portion 43, a holding recess portion 63 is formed as a holding portion into which the intermediate portion 82*c* of the lead wire 82 can be inserted and held. Specifically, as shown in FIGS. 9 and 13, the holding recess portion 63 is formed by recessing the rib 62 upward from a lower end 62*a* side. That is, the holding recess portion 63 is disposed to open downward on the lower end 62*a* side of the rib 62. In the embodiment, five ribs 62 are disposed on the left wall portion 43, and the holding recess portion 63 is formed in each of the five ribs 62. Specifically, the holding recess portion 63 is formed by cutting out a right lower end side of the rib 62, and a right edge portion is constituted by an outer surface of the left wall portion 43 (see FIG. 13). In the embodiment, the holding recess portion 63 has an opening width dimension H3 substantially equal to the thickness dimension T of the lead wire 82 and a length dimension (depth) L2 set slightly larger than the width dimension W of the lead wire 82 (see FIG. 13). In the embodiment, an outer shape of the holding recess portion 63 is substantially the same as that of the guide recess portion 58 described above. That is, in the embodiment, the holding recess portion 63 is configured to, when the insulator tube (reference numeral omitted) covering the outer peripheral side is slightly bent and inserted inside the holding recess portion 63, hold the lead wire 82 using a frictional force generated between an inner peripheral edge and the outer surface of the lead wire 82 (the outer surface of the insulator tube). On the outer peripheral side of the left wall portion 43, the intermediate portion 82*c* of the lead wire 82 is also inserted into and held by each holding recess portion 63, and disposed to extend in the front-rear direction on an outer peripheral surface side of the left wall portion 42 (to intersect (be orthogonal to) the axial direction of the peripheral wall portion 40) (see FIGS. 4 and 6 and the two-dot chain line in FIG. 10).

The decorative body 70 as the electronic component is electrically connected to the control device 90 provided on the vehicle body side, and can emit light at a predetermined time. The decorative body 70 is disposed in the region for the front door portion 35 in the ceiling wall portion 31 of the pad 30, and specifically, as described above, the decorative body 70 is disposed in the region on the back surface side on the rear edge 35*a* side in the front door portion 35, which is a region wide in the left-right direction. As shown in FIG. 3, the decorative body 70 has an outer shape as viewed in the upper-lower direction that is an elongated shape extending along the left-right direction, and is configured such that the main body portion 72, a light source unit 75, and the holding member 80 are stacked (see FIGS. 7 and 8). In the embodiment, on the front surface side of the pad 30, as described above, only the protrusion portions 73 of the main body portion 72 in the decorative body 70 are exposed (see FIG. 3). Although reference numerals are omitted, through holes through which the coupling protrusions 35*c* protruding from the back surface side of the front door portion 35 in the pad 30 can penetrate are formed in the main body portion 72, a light guide 78 and a substrate 76, which will be described later, in the light source unit 75, and the holding member 80.

The main body portion 72 has a substantially rectangular plate shape that is wide in the left-right direction, and has, on an upper surface side thereof, the protrusion portions 73 that protrude upward. In the embodiment, the protrusion portion 73 has a substantially rectangular outer shape, five protrusion portions 73 are arranged side by side in the left-right direction, and each can penetrate the through hole portion 35*b* provided in the front door portion 35 (refer to FIGS. 7 and 8). The protrusion portion 73 is configured such that an upper surface 73*a* is substantially flush with an upper surface of the front door portion 35. The main body portion 72 radiates visible light from the light source unit 75 from an upper surface 73*a* side of the protrusion portion 73 while further diffusing the visible light inside, and is made of synthetic resin such as polycarbonate resin or acrylic resin.

The light source unit 75 includes the substrate 76, a visible light source (visible light LED 77) attached to the substrate 76 and capable of emitting visible light when turned on, and the light guide 78 stacked on the substrate 76. The light guide 78 is disposed on a lower surface side of the main body portion 72. An outer shape of the substrate 76 is set to be larger than that of the light guide 78 to cover substantially an entire lower surface of the light guide 78. The visible light source (in the embodiment, the visible light LED 77) is arranged side by side at five locations corresponding to the respective protrusion portions 73 of the main body portion 72 on a front edge side of the substrate 76 (in front of the light guide 78) (see FIGS. 3 and 7). In the embodiment, as the visible light source, full-color visible light LED 77 in which light sources capable of emitting red light, green light, and blue light are sealed in one package and whose color can be changed by changing brightness of each light source is used. The visible light LED 77 is electrically connected to the control device 90 provided on the vehicle body side via the lead wire 82 connected to a back surface side of the substrate 76, and can be turned on to emit visible light of a predetermined color in response to an operation signal from the control device 90.

The holding member 80 can cover an entire lower surface of the substrate 76 in the light source unit 75, can hold the substrate 76 (light source unit 75), and includes a connector attachment portion 80*a* that partially protrudes downward at a center in the left-right direction (see FIGS. 7 and 8). The connector attachment portion 80*a* is a portion for attaching a connector 87 provided on one end (base portion 82*b*) side of the lead wire 82 and connecting the lead wire 82.

The decorative body 70 is disposed on the back surface side of the front door portion 35 by being locked at a predetermined location and penetrating the coupling protrusion 35*c* extending from the front door portion 35 in a state where the main body portion 72, the light source unit 75, and the holding member 80 are stacked and integrated, and is attached to the front door portion 35 by melting the tip end side of the coupling protrusion 35*c* with a lower surface side of the holding member 80 (see FIG. 8). Then, the lead wire 82 extending from the connector attachment portion 80*a* provided on the back surface side of the decorative body 70 (that is, the back surface side of an arrangement region for the decorative body 70 in the front door portion 35) and passing through the back surface side of the ceiling wall portion 31 is inserted into the slit 48, as an insertion opening formed in the front wall portion 41 in the peripheral wall portion 40, such that the connector 88 on the other end side (tip end 82*a* side) protrudes outside the pad 30 (see FIG. 14). The lead wire 82 protruding from the slit 48 extends leftward while the intermediate portion 82*c* is held by the guide recess portions 58 (holding portions) disposed on the front wall portion 41 side, is held by the holding recess portions 63 (holding portions) on the outer peripheral side of the left wall portion 43 after passing through a left rear corner portion 40*b* of the peripheral wall portion 40, is disposed substantially along the front-rear direction to cross the left wall portion 43 (to intersect the axial direction of the peripheral wall portion 40), and the vicinity of the tip end 82*a* is inserted into the insertion recess portion 24 formed in the bottom wall portion 21 of the bag holder 20 (see FIGS. 4 to 6). As shown in FIGS. 4 to 7, the connector 88 provided on the tip end 82*a* side of the lead wire 82 is disposed on a lower surface side of the bag holder 20 (bottom wall portion 21) so as to be locked to the locking protruding piece 25 protruding downward from the bottom wall portion 21 of the bag holder 20. That is, in the steering wheel 1 of the embodiment, the lead wire 82 extending from the decorative body 70 is disposed such that the intermediate portion 82*c* extends from a center on the front side of the peripheral wall portion 40 in the bag holder 20 to a left rear end side of the peripheral wall portion 40 to intersect the axial direction of the peripheral wall portion 40 on the outer peripheral side of the peripheral wall portion 40 (the intermediate portion 82*c* is wound around the outer peripheral side of the peripheral wall portion 40 by about ⅓ turn) (see FIGS. 4 to 6).

Next, mounting of the steering wheel 1 of the embodiment to a vehicle will be described. In the pad 30 in a state where the decorative body 70 is attached, in a state of being inserted through the slit 48, the intermediate portion 82*c* of the lead wire 82 extending from the back surface side of the decorative body 70 (the back surface side of the front door portion 35) is held by the guide recess portions 58 provided on the front wall portion 41 side and the holding recess portions 63 formed in the ribs 62 on the left wall portion 43. Then, the airbag device 15 can be assembled by attaching the pad 30 to the bag holder 20 to which the folded airbag 16 and the inflator 17 are attached to cover the periphery of the folded airbag 16. At this time, a portion of the lead wire 82 in the vicinity of the tip end 82*a* is inserted into the insertion recess portion 24 formed in the bottom wall portion 21 of the bag holder 20, and the connector 88 on the tip end

82*a* side is locked to the locking protruding piece 25 formed in the bottom wall portion 21. Thereafter, the airbag device 15 is attached to the steering wheel body 7 attached to the vehicle body side using a horn switch unit (not shown), the lead wire 82 extending from the decorative body 70 is connected to a lead wire (not shown) extending from the control device 90, the inflator 17 is electrically connected to the control device 90, and thus the airbag device 15 can be assembled to the steering wheel body 7 and the steering wheel 1 can be mounted to the vehicle.

In the steering wheel 1 (steering device) of the embodiment, since the intermediate portion 82*c* of the lead wire 82 extending from the arrangement region for the decorative body 70 as the electronic component is disposed to intersect the axial direction of the peripheral wall portion 40 on the outer peripheral side of the peripheral wall portion 40 of the pad 30, the connector 88 on the tip end 82*a* side can be easily disposed to a position separated from below the decorative body 70 in the bag holder 20 as the holding member (in the embodiment, a position on a rear left end side separated from directly below the decorative body 70 disposed on a front side). That is, in the steering wheel 1 of the embodiment, a degree of freedom in an arrangement position of the connector 88 in the bag holder 20 is high, in other words, an arrangement position of the decorative body 70 on the pad 30 is also not affected by the arrangement position of the connector 88.

Therefore, in the steering wheel 1 (steering device) of the embodiment, a degree of freedom in the arrangement position of the decorative body 70 (electronic component) in the pad 30 is high.

In the steering wheel 1 of the embodiment, the holding portions (the guide recess portions 58 and the holding recess portions 63) capable of holding the intermediate portion 82*c* of the lead wire 82 are disposed on an outer peripheral surface side of the peripheral wall portion 40. Therefore, by holding the intermediate portion 82*c* in the guide recess portions 58 and the holding recess portions 63, the intermediate portion 82*c* of the lead wire 82 can be prevented from moving with respect to the peripheral wall portion 40, and handling workability when the pad 30 is held by the bag holder 20 as the holding member is improved.

Further, in the steering wheel 1 of the embodiment, the holding recess portion 63 which is formed by recessing the rib 62 and in which the intermediate portion 82*c* can be inserted and held is disposed as the holding portion on the rib 62 which is formed to protrude outward on the outer peripheral surface 40*a* side of the peripheral wall portion 40. Therefore, in the configuration in which the strength reinforcing rib 62 is disposed to protrude on the outer peripheral surface side of the peripheral wall portion 40, the holding recess portion 63 in which the lead wire 82 can be inserted and held is provided on the rib 62, which also prevents the intermediate portion 82*c* of the lead wire 82 from passing outside the rib 62 and floating from the peripheral wall portion 40 (left wall portion 43). As a result, an increase in an outer diameter dimension of the peripheral wall portion 40 including the lead wire 82 (a width dimension of the peripheral wall portion in a direction orthogonal to the axial direction) can be prevented. If such a point is not taken into consideration, a configuration may be adopted in which a separate holding member is provided in the rib instead of providing the holding recess portion, and the lead wire is disposed to pass outside the rib.

Figure 16:
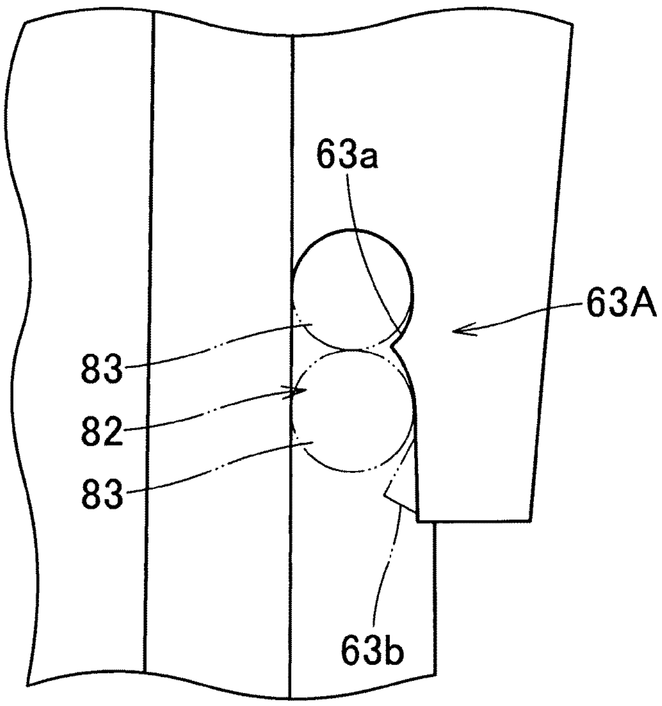
FIG. 16 is a schematic view showing a holding recess portion that is another embodiment of the present disclosure.

Further, in the steering wheel 1 of the embodiment, the guide recess portion 58 and the holding recess portion 63 constituting the holding portions are disposed to open downward on the lower ends 55*a*, 62*a* side of the coupling rib 55 and the rib 62 disposed along the axial direction (upper-lower direction) of the peripheral wall portion 40. In other words, since the guide recess portion 58 and the holding recess portion 63 are formed along a mold removal direction (not shown) when the pad 30 is molded, an increase in manufacturing cost of the pad 30 can be prevented. If such a point is not taken into consideration, the holding recess portion may be formed, for example, in an intermediate portion of the rib in the upper-lower direction by cutting out from an outer edge side (a left edge side in the embodiment). Further, in the steering wheel 1 of the embodiment, the side wall portion 22L of the bag holder 20 disposed on the left wall portion 43 side is disposed to cover an outside of the peripheral wall portion 40 (left wall portion 43) and extend to the vicinity of the lower end 62*a* of the rib 62 disposed on the left wall portion 43 and including the holding recess portion 63. Therefore, even if the lead wire 82 is separated from the holding recess portion 63 that opens downward, an outer peripheral side of the lead wire 82 can be pressed by the side wall portion 22L of the bag holder 20, and the lead wire 82 (intermediate portion 82*c*) can be effectively prevented from separating from the peripheral wall portion 40 (left wall portion 43). If such a point is not taken into consideration, the side wall portion of the bag holder may not be disposed to extend to the vicinity of the lower end of the rib. As shown in FIG. 16, a holding recess portion 63A may be configured such that a protrusion portion 63*a* protruding inward is provided on an inner peripheral edge (in the embodiment, a right edge side separated from the left wall portion) to prevent the lead wire 82 from being separated. In FIG. 16, the protrusion portion 63*a* is formed at an intermediate portion in the upper-lower direction so as to be able to enter a recess generated between the linear bodies 83, 83 constituting the lead wire 82. The protrusion portion 63*b* may be provided on an opening end side (lower end side) as indicated by a two-dot chain line in FIG. 16.

Further, in the steering wheel 1 of the embodiment, the insertion recess portion 24 into which the tip end 82*a* side of the lead wire 82 can be inserted and locked is formed in the vicinity of the left rear end of the bag holder 20. Therefore, after the connector 88 on the tip end 82*a* side is locked to the bottom wall portion 21 side (locking protruding piece 25) of the bag holder 20, a region on the tip end 82*a* side of the lead wire 82 can be prevented from largely moving with respect to the bag holder 20, and the separation of the lead wire 82 from the holding recess portion 63 provided in the rib 62 can be prevented. As a result, attachment workability when attaching the airbag device 15 to the steering wheel body 7 is good.

In the steering wheel 1 of the embodiment, as the electronic component disposed on the pad 30, the decorative body 70 that emits light at a predetermined time is disposed, but the electronic component is not limited to the decorative body 70. The present invention is also applicable to, for example, a steering device having a configuration in which a display, a camera for driver monitoring, or the like is mounted on the pad as the electronic component. Although the steering wheel 1 of the embodiment includes the airbag device 15, the present invention is also applicable to a steering wheel (steering device) of a type that does not include an airbag device.

What is claimed is:

1. A steering device comprising:

a steering body;

a pad disposed on an upper side of a boss portion;

a holding member disposed on a lower surface side of the pad to hold the pad and attached to a steering body side; and an electronic component disposed on the pad and electrically connected to a control device provided on a vehicle body side, wherein the pad includes a ceiling wall portion disposed on a driver side and a peripheral wall portion extending downward in a tubular shape from a vicinity of a peripheral edge of the ceiling wall portion, a lead wire extending from an arrangement region for the electronic component in the ceiling wall portion extends from a back surface side of the ceiling wall portion to an outer peripheral side of the peripheral wall portion passing through an insertion opening provided in the peripheral wall portion, a connector disposed on a tip end side of the lead wire is attached to a lower surface side of the holding member, and an intermediate portion of the lead wire is disposed on the outer peripheral side of the peripheral wall portion to intersect an axial direction of the peripheral wall portion.

2. The steering device according to claim 1, wherein a holding portion capable of holding the intermediate portion of the lead wire is disposed on an outer peripheral surface side of the peripheral wall portion.

3. The steering device according to claim 2, wherein the pad is configured to cover a folded airbag, the holding member is implemented by a bag holder that holds the airbag, on the outer peripheral surface side of the peripheral wall portion, a strength reinforcing rib is formed substantially along the axial direction of the peripheral wall portion while protruding outward, and as the holding portion, a holding recess portion in which the intermediate portion is able to be inserted and held is formed by recessing the rib.

4. The steering device according to claim 3, wherein the holding recess portion is disposed on a lower end side of the rib to open downward, and a side wall portion of the bag holder is disposed to cover outside the peripheral wall portion and extend to at least a vicinity of a lower end of the rib.

* * * * *